United States Patent [19]

Porat

[11] Patent Number: 4,708,759
[45] Date of Patent: Nov. 24, 1987

[54] EDGE LOCATING DEVICE

[75] Inventor: Thomas M. Porat, Weare, N.H.

[73] Assignee: Crathern Engineering Co., Inc., Contoocook, N.H.

[21] Appl. No.: 782,130

[22] Filed: Sep. 30, 1985

[51] Int. Cl.4 .................... B32B 31/00; B65H 7/02; B65H 9/10
[52] U.S. Cl. .................... 156/360; 156/364; 156/538; 271/227; 271/233
[58] Field of Search ............... 74/110, 107; 92/85 A; 412/19; 271/227, 233, 222, 238, 241, 242, 249, 250, 103; 156/360, 364, 366, 378, 538, 539

[56]  References Cited
U.S. PATENT DOCUMENTS

| 138,546 | 5/1873 | Wheeler | 92/85 A |
| 2,740,382 | 4/1956 | Morgan | 92/85 A |
| 3,400,031 | 9/1968 | Crathern, III | 156/366 |
| 3,522,129 | 7/1970 | Crathern, III | 156/364 |
| 4,318,541 | 3/1982 | Nagel et al. | 271/222 |
| 4,336,094 | 6/1982 | Mills | 156/364 |
| 4,341,299 | 7/1982 | Walker et al. | 271/233 |
| 4,345,960 | 8/1982 | Mims et al. | 156/364 |
| 4,388,972 | 6/1983 | Gidlund | 92/85 A |
| 4,547,115 | 10/1985 | Charbonnet | 271/241 |
| 4,603,846 | 8/1986 | Miles | 271/250 |

Primary Examiner—Donald E. Czaja
Assistant Examiner—Louis Falasco
Attorney, Agent, or Firm—Schiller, Pandiscio & Kusmer

[57]  ABSTRACT

An edge locating device is particularly useful in a system having an articulating frame for supporting and aligning a first sheet of material relative to a second sheet of material supported on a belt below. The device is attachable to the articulating frame and has an edge contact element for locating the edge of the first sheet and a radiation source and detector for locating the edge of the second sheet. The edge contact element, source and detector are fixed with respect to one another and movable between a first position wherein the element is spaced from the edge of the first sheet and a second position wherein the element contacts the edge of the first sheet. When moved to the second position the source and detector can be used to move the articulating frame until the edge of the second sheet is located.

22 Claims, 13 Drawing Figures

EDGE LOCATING DEVICE

FIELD OF INVENTION

This invention relates generally to apparatus for laminating sheet materials, and more particularly, to an improved locating device for precisely positioning at least one edge of at least one sheet with respect to a corresponding edge of another sheet prior to laminating the two sheets together.

PRIOR ART

In the printing and sheet laminating industries it is often necessary to align one flat sheet of material with another flat sheet of material. For instance, in the manufacture of record album jackets each album cover is typically made by laminating a preprinted cover sheet of material (referred to as a "wrapper") to two backing members, such as stiff cardboard blanks, to form a laminated piece. The laminated piece is subsequently "wrapped" to form the jacket. It is extremely desirable to precisely register the wrapper with two cardboard blanks so that the printing on the album jacket is properly positioned on the front, back and spine of the album jacket. Similar problems are encountered when manufacturing book cases (or covers).

Various devices and systems have been developed to accurately laminate two or more sheets of materials. Examples of such systems are described in U.S. Pat. Nos. 3,400,031; 3,522,129; 4,336,094; and 4,345,960. All of these systems each include a high speed conveyor belt for successively and individually moving sheets of material, such as the wrapper of an album jacket or book case, having an adhesive coating on its top surface. The belt is preferably stopped so that each sheet on the belt can be brought into a laminating station where the sheet is held in a stationary position with repect to an alignment and laminating apparatus. The apparatus includes a carriage or articulating frame positioned above the conveyor belt. A source of radiation and a sensor for sensing the radiation are secured to the articulating frame. The source of radiation projects a beam onto the belt below where it is at least partially reflected toward the sensor. The sensor is positioned so as to receive the reflected radiation from the belt so that one or two edges of the wrapper positioned on the conveyor below the articulating frame can be located and used to move the articulating frame to properly register the blank or blanks supported by the articulating frame relative to the wrapper below. In this regard the sensors provide signals to a control system for controlling the movement of the articulating frame in a plane sustantially parallel to the top of the conveyor belt, where the wrapper sheet is supported. The blank or blanks are then lowered into contact with the adhesive side of the cover sheet.

These systems operate well at certain operational speeds, wherein the blank sheet(s) in the articulating frame are precisely aligned with respect to the wrapper on the conveyor belt below. However, it has become increasingly desirable to operate these laminating systems at much higher speeds than those at which they have been conventionally operated. At these higher speeds, misalignment may occur between the blank sheet(s) in the articulating frame and the wrapper on the conveyor belt below, due to misalignment of the blank sheet(s) within the articulating frame as they are moved into the frame. Since the source of radiation and sensor are mounted to the articulating frame, these misalignments will not be detected.

OBJECTS OF THE INVENTION

It is a general object of the present invention to reduce or overcome the above-noted problems of the prior art.

It is another and more specific object of the present invention to provide a more reliable registration between sheet(s) of material supported by a first support, such as the articulating frame of a laminating apparatus, with respect to a second sheet(s) of material supported by a second support, such as a conveyor belt.

And another object of the present invention is to provide an improved apparatus for laminating sheets of material having means for moving the material into precise registration with respect to one another at relatively fast speeds.

Other objects of the invention will in part be obvious and will in part appear hereinafter. The invention, accordingly, comprises the apparatus possessing the construction, combination of elements, and arrangement of parts which are exemplified in the following detailed disclosure, and the scope of the application of which will be indicated in the claims.

SUMMARY OF THE INVENTION

These and other objects of the present invention are achieved by a system for laminating at least a first sheet of material to a second sheet of material, wherein the system comprises, in combination:

first support means for supporting said first sheet;

second support means for supporting said second sheet;

edge locating means secured to said second support means, said edge locating means including means for making contact with and locating at least one edge of said second sheet supported by said second support means and for locating the corresponding edge of said first sheet relative to said one edge of said second sheet; and means responsive to said edge locating means for moving at least one of said support means relative to the other so as to move said sheets into a predetermined alignment relation so that said one edge of said second sheet is disposed in a predetermined position relative to the corresponding edge of said first sheet, and for moving said sheets into contact with one another so as to laminate said sheets in said alignment relation.

In accordance with another aspect of the present invention a device is provided for use in locating the edge of a first sheet supported by a first support and the edge of a second sheet supported by a second support spaced a predetermined distance from said first support so as to register said sheets in a predetermined relation. The device comprises, in combination:

means for securing said device to said second support; and mechanism means, including an edge contact element for locating the edge of said second sheet, and a source of radiation and a detector of said radiation for locating said edge of said first sheet; wherein (1) said source and detector are mounted on said mechanism means so as to be fixedly spaced apart from said edge contact element by a predetermined distance, and (2) said edge contact element, source and detector are movable relative to the edge of said second sheet between a first relative position, wherein said edge contact element is spaced from the edge of said second sheet, and a second relative position wherein said edge contact element contacts said edge of said second sheet.

DRAWINGS

For a fuller understanding of the nature and objects of the present invention, reference should be had to the following detailed description taken in connection with the accompanying drawings, wherein:

FIG. 1 is a perspective view of the type of prior art laminating apparatus described in U.S. Pat. No. 4,336,094;

DETAILED DESCRIPTION OF THE INVENTION

Figure 1:
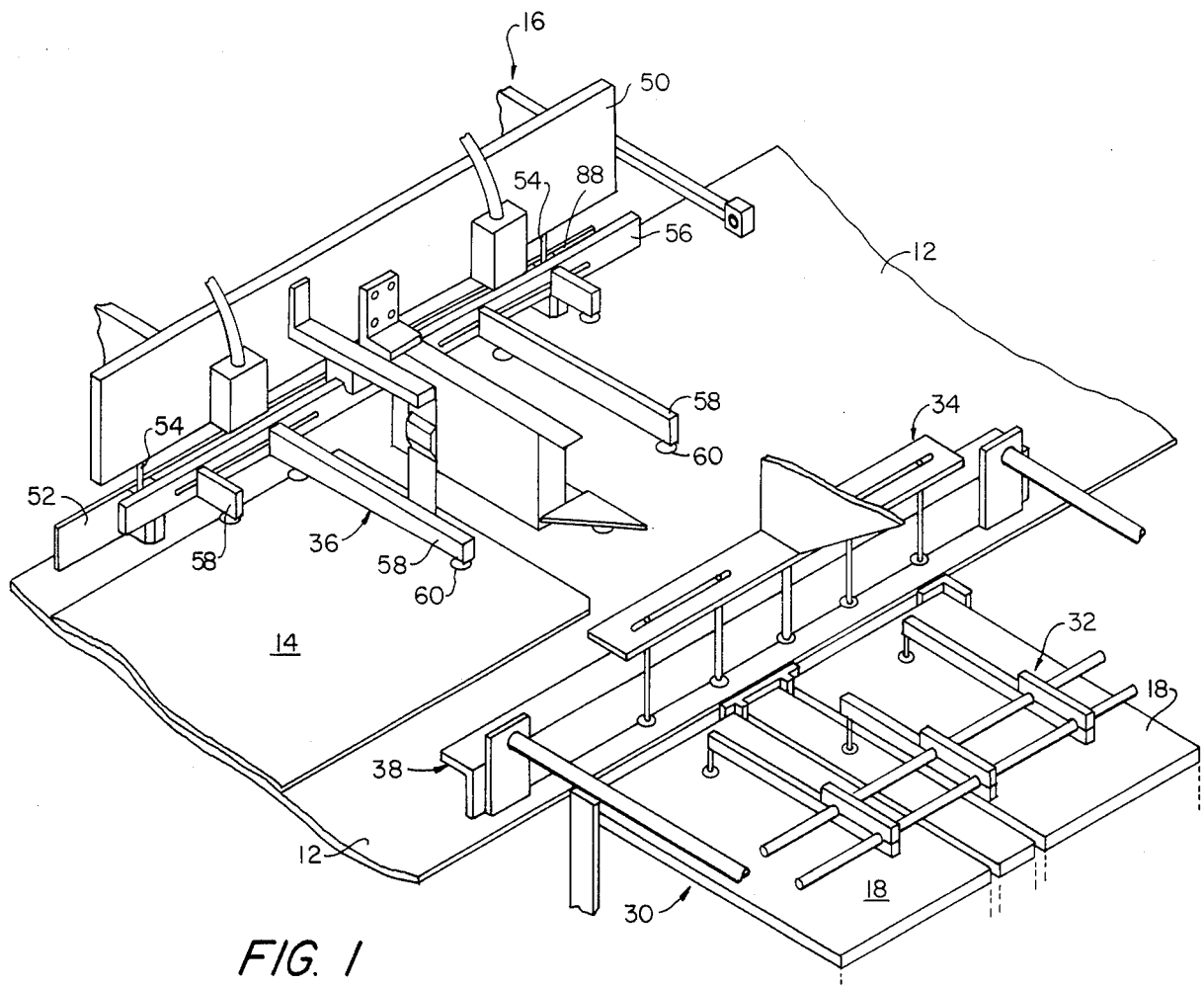

Referring to FIG. 1, the prior art system, shown and described in U.S. Pat. No. 4,336,094, generally includes conveyor belt 12 for periodically providing a sheet of material 14, i.e., a wrapper, adhesive side up, to a position just below the alignment and laminating apparatus 16. The belt is preferably intermittently stopped so that (1) each sheet 14 can be held stationary relative to the apparatus 16, and (2) the backing sheet members 18 can be properly aligned with and secured to respective portions of the sheet 14 so as to provide a laminate. Each laminate is subsequently transferred by belt 12 from the apparatus 16 to apparatus (not shown) for wrapping the edges of each sheet 14 around the corresponding edges of the backing sheet members, as described in U.S. Pat. No. 4,336,094.

The alignment and laminating apparatus 16 generally includes a supply station 30 including a supply tray (not shown) for supporting a supply of backing sheet members 18 on one side of the belt 12. A lifting or pick-up assembly 32 is provided for raising at least a portion of the support members from their respective positions on the tray. The apparatus 16 also includes a transport assembly 34 for transporting the backing sheet members. Means including the articulating frame 36, are provided (1) for registering the backing sheet members with respect to one another and to the adhesive coated side of the sheet 14 positioned on the belt 12 below, and (2) for moving the sheet members into contact with the sheet 14. The pick up assembly 32 raises the leading edge of each sheet member 18 and transport assembly 34 holds the leading edge of each member as it moves the members toward the articulating frame 36. Apparatus 16 also includes means, including hold-up bar assembly 38, supporting the sheet members as transport assembly 34 moves the sheet members from the pick-up assembly 32 to the articulating frame 36.

The articulating frame 36 comprises a main frame member 50 and an alignment bar 52, the former supporting the latter with support arms 54. The articulating frame also includes plunger bar 56. Arms 58, secured to bar 56 and provided with suction cups 60, support the members 18 in the articluating frame during the alignment and laminating process. As described in greater detail in U.S. Pat. No. 4,335,094, the entire frame is adapted to be moved, in response to a hydraulic system (not shown), in either one of two directions in a plane parallel to the belt 12, while the plunger bar 56 and arms 58 are adapted to be moved relative to main frame member 50 and alignment bar 52, toward and away from the belt, and thus sheet 14.

As described in U.S. Pat. No. 4,336,094, the transport assembly 34 moves the members 18 into contact with the alignment bar 52, whereupon a vacuum is applied through the cups 60 of the articulating frame 36 to hold the members as the transport assembly is moved back towards the supply station 30.

Figure 2:
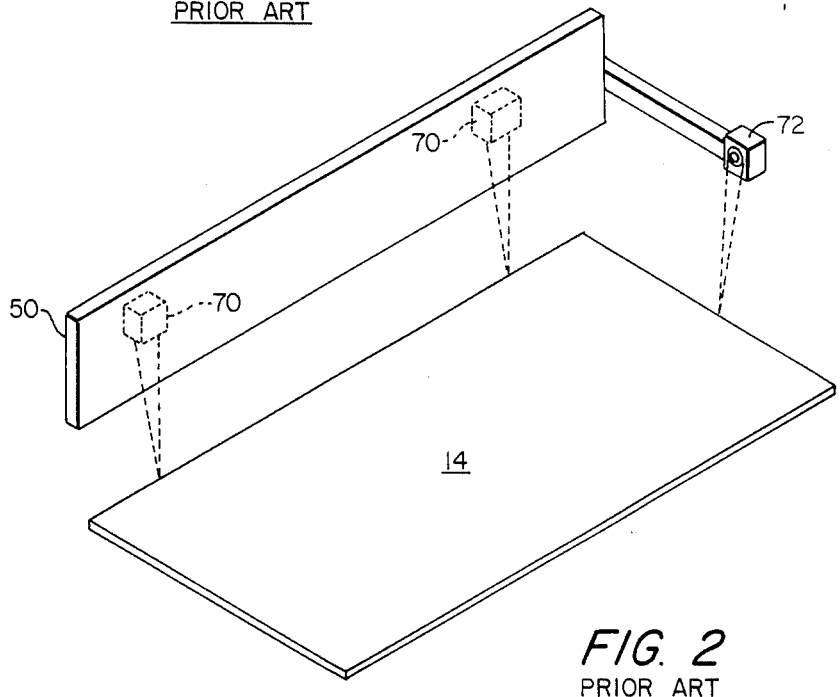
FIG. 2 is a perspective view of details of the sheet edge sensor system mounted on the articulating frame of the prior art apparatus of FIG. 1.

As shown more clearly in FIG. 2, the patented system shown in U.S. Pat. 4,336,094 includes a pair of light source-light detector units 70. Units 70 are suitably secured at spaced-apart locations to the rear of frame member 50, while an arm 72 extends from the frame member 50 over the belt 12 where it supports a third light source-light detector unit 74. The units are identical to those described in U.S. Pat. Nos. 3,400,031 and 3,522,129. As schematically shown in FIG. 2, each unit 70 and 74 generally provides a beam of light directed down onto the belt 12. The beam is directed at the belt at an angle of incidence such that the corresponding detector of the unit is positioned to receive reflected light where the beam strikes the belt. The belt 12 is made of a light absorptive material and the sheet 14 is made of a more reflective material than the belt. The threshold of each detector of each unit 70 and 74 is set so that insufficient light (below the detector threshold) is reflected to the detector when the entire light beam strikes the belt below, while sufficient light (above the threshold of the detector) will be reflected to the detector when the beam strikes a portion (i.e., the edge) of the sheet 14. As described in U.S. Pat. Nos. 3,522,129 and 4,336,094, the hydraulic system is operated to move the entire assembly 36 in a plane parallel to the belt in two transverse directions until units 70 and 74 detect two different, transverse edges of the sheet positioned on the belt below, as schematically illustrated in FIG. 2.

Once alignment with both edges are made, a cable system is used to lower the plunger bar 56 and arms 58, as well as the members 18, held by cups 60 so that the members are brought into contact with the adhesive side of the sheet 14.

The system described provides accurate registration of the members 18 with the sheet 14 at normal operational speeds of the apparatus 16. However, as the speed is increased, as the transport assembly moves the members into position, the members tend to come into contact with the alignment bar 52 too fast. Consequently, the members 18 can actually become misaligned in the articulating frame 36.

In accordance with the present invention, an edge locating device 80, shown in detail in FIGS. 3-7, is substituted for the unit 74 of the apparatus shown in FIGS. 1 and 2, for more accurately aligning at least the edge of the member 18 positioned in the articulating frame with the leading edge of the sheet 14 on the belt below.

The edge locating device 80 preferably comprises a mounting bracket 86 for securing the device to the portion of the alignment bar 52 indicated as 88 in FIG. 1, in any suitable manner, such as screws 90. Device 20 includes a U-shaped support bracket 92 having a middle section 94 secured to the bracket 86 and two mutually opposing end sections 96a and 96b. The end sections 96 of U-shaped bracket 86 support guide rod 98, the edge locating mechanism 100 and the main shaft 102 in a substantially parallel relation with one another, as well as to the middle section 94 of the bracket. Bushings 104 mounted in the end sections 96 of the bracket 86 are provided so that the main shaft 102 slides in the bushings substantially parallel to the middle section 94 of the bracket.

Figure 3:
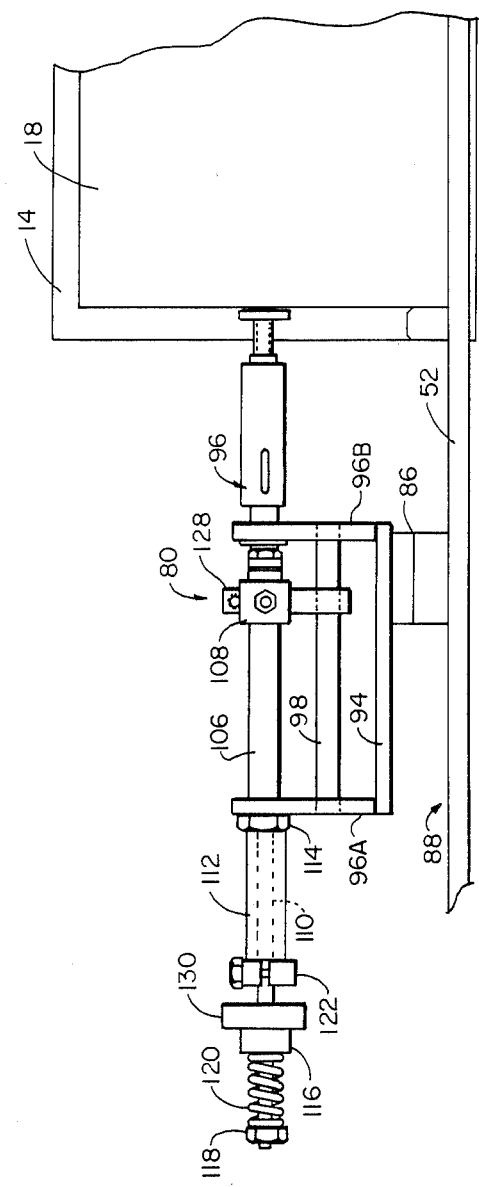
FIG. 3 is a detailed plan view of an apparatus of the type shown in FIG. 1, which has been modified to incorporate the edge locating device in accordance with the principles of the present invention.
Figure 4:
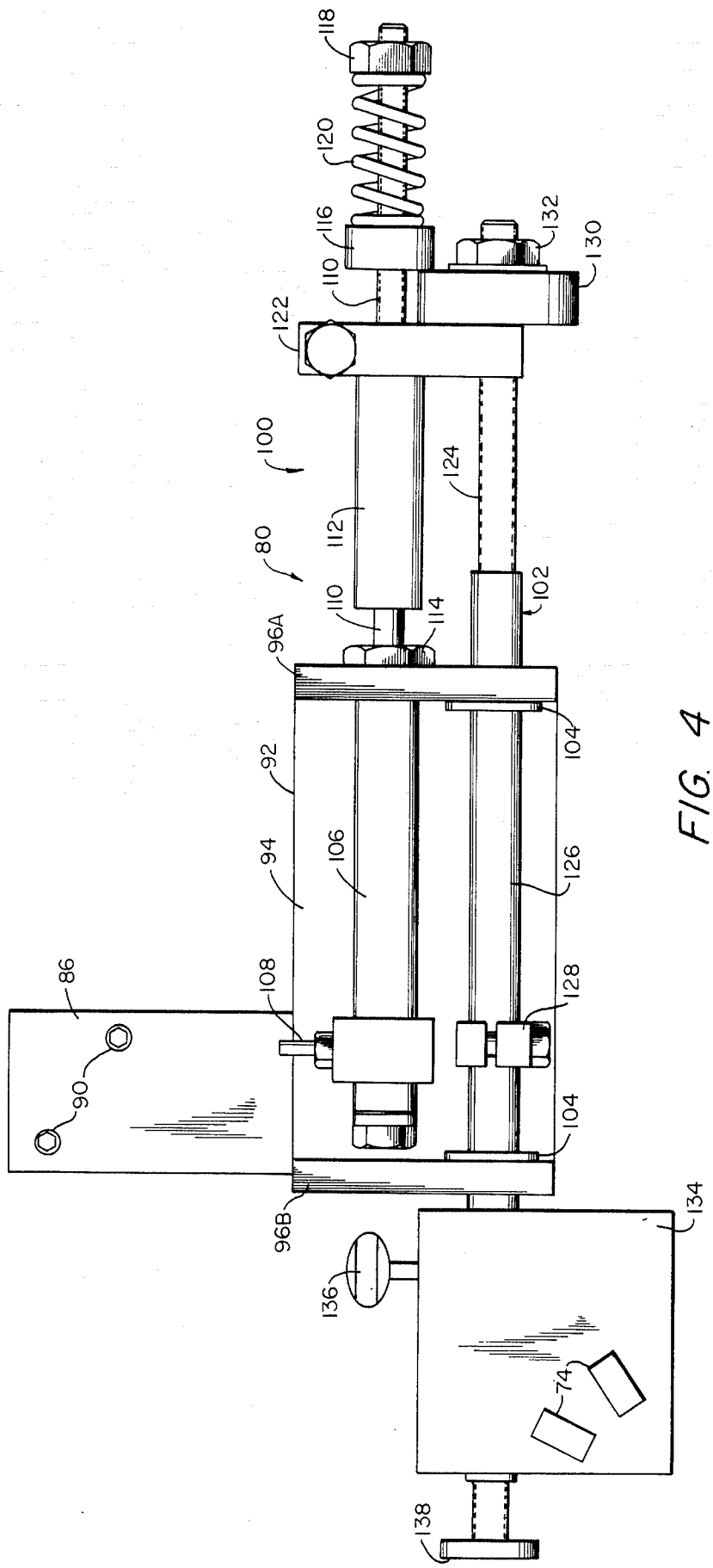
FIG. 4 is a front elevation view of the edge locating device.

The mechanism 100 comprises a pneumatic cylinder 106 supported by the end sections 96 of the bracket 92 and having an air fitting 108 for attaching the cylinder to a source of positive or negative (vacuum) pressurized air, and preferably to a source of positive pressure provided in the alignment and laminating apparatus. The latter, in turn, includes valve means (not shown) for applying a positive pressure to the cylinder 106 when operating the mechanism 100. Mechanism 100 also includes a cylinder rod 110 adapted to move into the cylinder when a positive pressure is applied (in a right direction as shown in FIG. 3) and into the cylinder (in a left direction as shown in FIG. 3) when the positive pressure is withdrawn, due to an internal spring (not shown) within the cylinder. A sleeve 112 is secured to and moves with the rod 110 as the rod moves into and out of the cylinder 106.

The rod 110 is attached to coupling means for transmitting forces from the rod 110 to the main shaft 102. More specifically, the end of rod 110, remote from the cylinder 106, is threaded and provided with a sleeve 116 adapted to slide on the rod. A nut 118 is screwed onto the end of the threaded portion of the rod, and a compression spring 120 is disposed between the sleeve 116 and nut 118.

Figure 6:
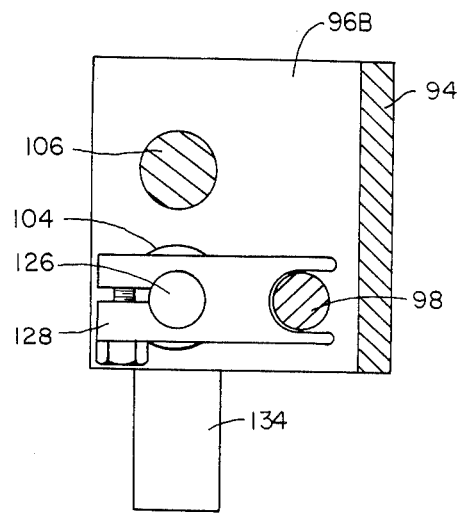
FIG. 6 is a sectional view taken along line 6—6 in FIG. 4.
Figure 5:
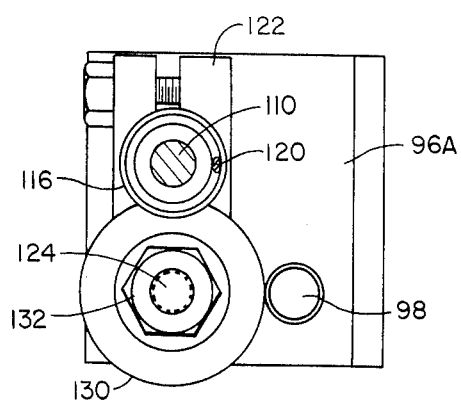
FIG. 5 is an end view taken along line 5—5 in FIG. 4.

A yoke 122 is secured to and movable with the sleeve 112. As best shown in FIG. 6, the yoke includes an opening 123 at its end opposite to the end attached to the sleeve 112 so that the main shaft 102 and sleeve can each move in an axial direction relative to one another under certain circumstances, described hereinafter.

The main shaft 102 includes a threaded shaft 124 secured in an outer tube 126 so that rotation of shaft 124 relative to the tube 126 will axially move the shaft 124 relative to the tube. The tube 126 is slidably secured in the bushings 104. A second yoke 128 has one end secured to the tube 126 and its other end provided with an opening for receiving and moving axially relative to the guide rod 98.

The end of the threaded shaft 124 adjacent the sleeve 116 is provided with adjustment wheel 130, threaded so that rotation of the wheel moves the wheel and the shaft 124 axially in an axial direction. The wheel is positioned between and adapted to contact the sleeve 116 and the yoke 122 when the spring 120 is at its most relaxed position. A retaining washer and nut 132 are provided on the end of the shaft 124 so as to lock the wheel to the shaft 124 so that the wheel rotates with the shaft.

The portion of the main shaft 102 extending from the opposite side of end section 96b includes the end of tube 126 and the end of the threaded shaft 124. A block 134 for supporting the light source-light detector unit 74 is mounted on this end of the tube and secured in a selected axial position. The block 134 is preferably mounted on the tube so that rotation of main shaft 124 will cause the block 134 to move axially along the shaft relative to the end of the shaft. A piece of plastic, such as the material manufactured under the trademark Delrin, may be provided in the block, for example, engaging the shaft 124 by pressure from the thumb screw 136 so that the block will respond to rotation of the shaft 124.

Finally, the remote end of the shaft 124 is provided with the edge contact element 138.

Figure 7A:
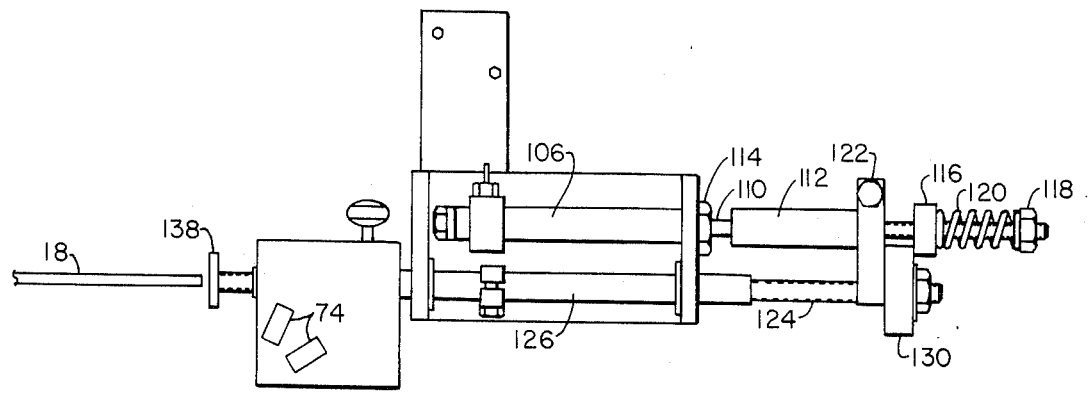
FIGS. 7A-7C illustrate the operation of the edge locating device in accordance with the present invention.
Figure 7B:
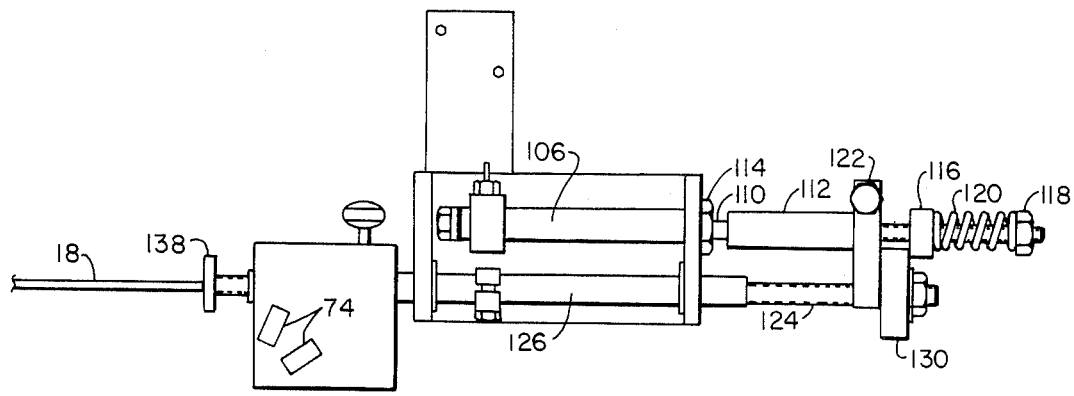
Figure 7C:
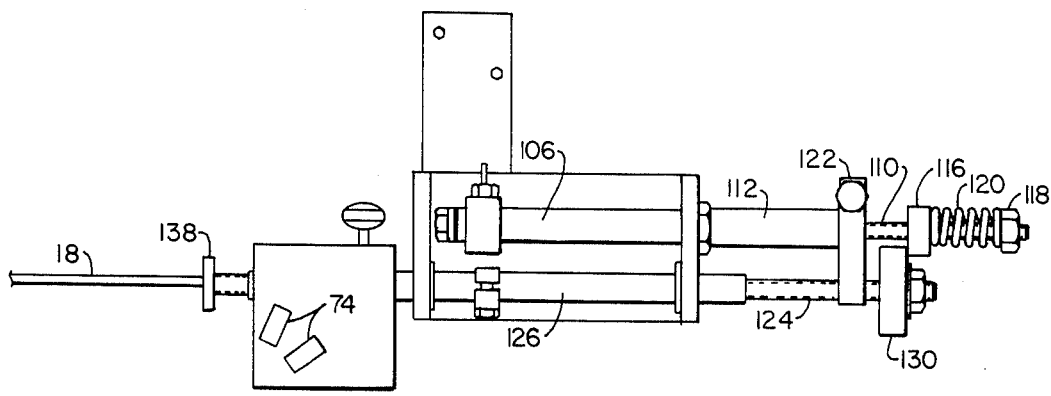

As shown in FIGS. 7A-7C, in operation, sheet member(s) 18 are moved into position in the articulating frame 36 and come into contact with the alignment bar 52. At this time, the contact element 138 will be slightly spaced from the edge of the member 18 as shown in FIG. 7A. A vacuum is now applied through the fitting 108 of the the cylinder 106. The vacuum draws the shaft 110 into the cylinder. As the shaft 110 moves to the left, the contact element 138 will move into contact with the edge of the member 18, as shown in FIG. 7B. In this position sleeve 112 is spaced from nut 114. The shaft 110 continues to travel to the left into the cylinder after element 138 contacts the edge of member 18. In order to accommodate this overstroke, the force applied by the edge of the member against the contact element 138 will be transmitted through the shaft 124 to the wheel 130, which in turn restrains the sleeve 116. Since shaft 110, and therefore the nut 118, continue to move, sleeve 116 slides on shaft 110 compressing the spring 120 against nut 118 until sleeve 112 contacts nut 114, as shown in FIG. 7C. In this regard, the amount of force applied by the contact element 138 to the edge of the member 18 will be insufficient to move the board relative to the suction cups 60 so that the member will not be prematurely released.

It will be appreciated that the distance between the unit 74 and the contact element 138 can be adjusted by rotating wheel 130 so as to move the block 134 to the precise axial position on the tube 126 relative to the element 138.

Figure 8:
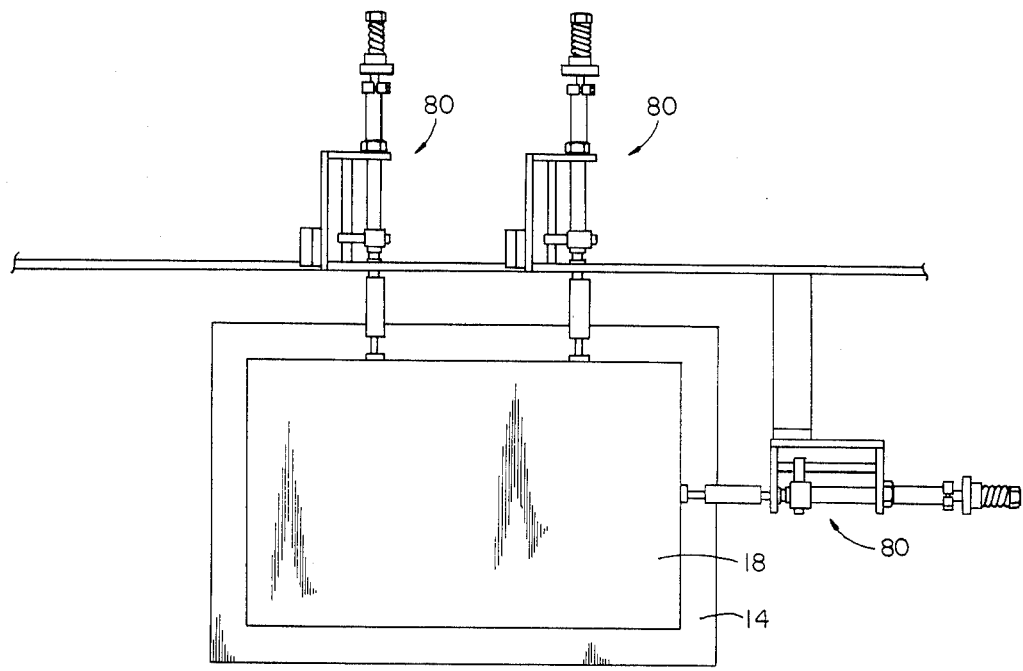
FIG. 8 is a plan view of a portion of an apparatus of the type shown in FIG. 1, which has been further modified to incorporate an edge locating device for registering two edges of the sheet blank(s) with the wrapper.

It will be obvious that the light source-light detector units 70 attached to the articulating frame 36, as shown in FIGS. 1 and 2, also can each be secured to an edge locating device 80, as illustrated in FIG. 8. In such an arrangement, suitable apertures can be provided in the alignment bar 52 large enough so that each contact element of the additional devices 80 will freely pass through the alignment bar into contact with the appropriate edge of the member(s).

Figure 9:
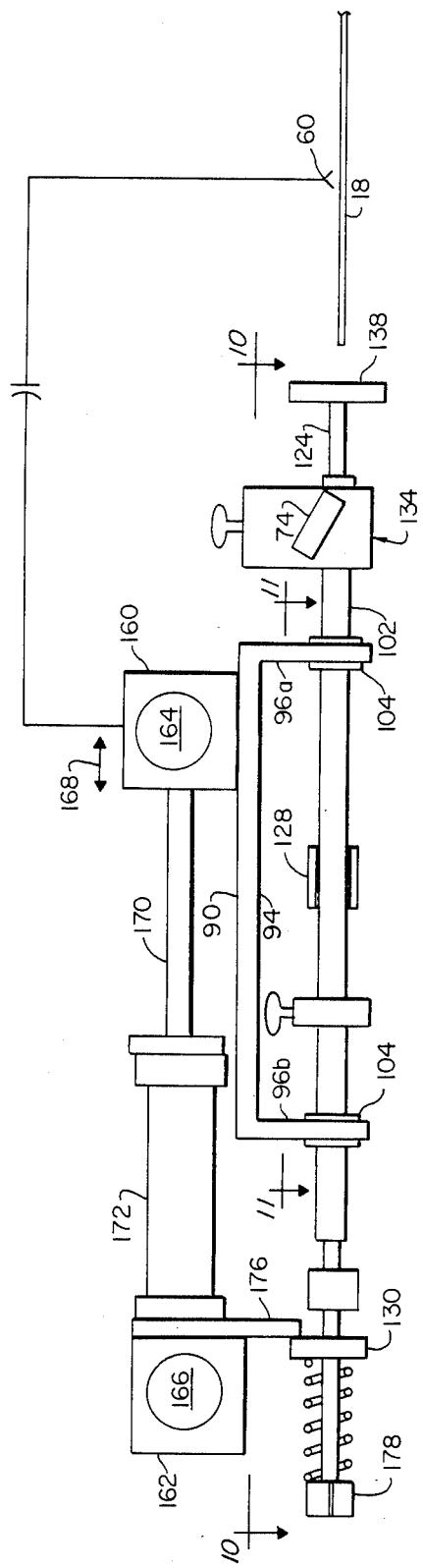
FIG. 9 is a side view of a portion of an apparatus of the type shown in FIG. 1, which has been further modified to incorporate an edge locating device for registering two edges of the sheet blank(s) with the wrapper.
Figure 10:
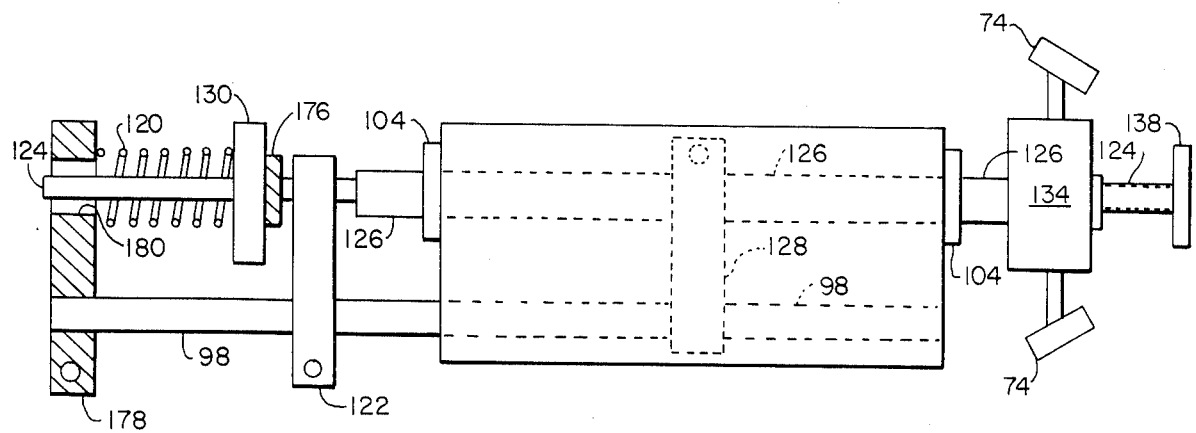
FIG. 10 is a cross-sectional view taken along line 10—10 of FIG. 9.
Figure 11:
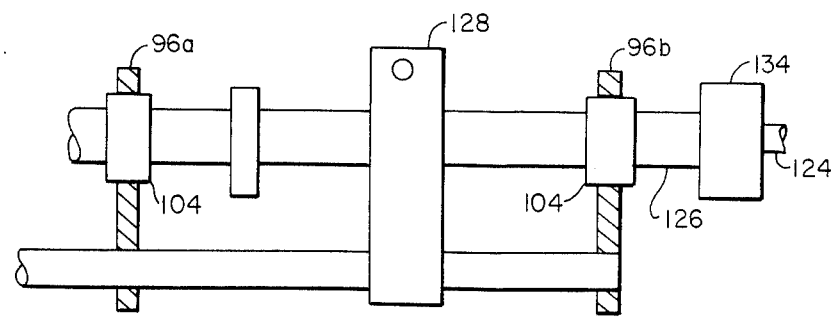
FIG. 11 is a cross-sectional view taken along line 11—11 of FIG. 9.

An alternative edge locating device is shown in FIGS. 9-11, wherein the alignment and laminating system is modified to move the sheet member 18 into contact with the edge contact element 138. In such an arrangement the hydraulic cylinder 106 of the device shown in FIGS. 3-7 may be eliminated. The device 80A, comprises a front and a rear block 160 and 162, respectively mounted on a floating shaft 164 and fixed shaft 166. During the alignment process the floating shaft 164 is adapted to move toward shaft 166 as indicated by arrow 168 in FIG. 9. The floating shaft 164 is also coupled to the articulating frame 36 and coupled to the cups 60, so that the edge of the sheet. member 18 can be brought into contact with the element 138 while the shaft 164 is moved toward shaft 166. Block 160 is secured to one end of a rod 170, which in turn has its other end mounted to move within the cylinder 172. The cylinder 172 has its other end secured to block 162. A stop 176 is also secured to block 162 for engaging the wheel 130.

Block 160 is secured to the back side of the bracket 92 so that main shaft 124 and guide rod 98 extend below the block 160. The guide rod 98 is secured in the end sections 96b of the bracket 92 and at one end to the spring retainer element 178. The latter is provided an aperture 180 larger than the diameter of the main shaft 124 so that the latter freely moves through the aperture. The yoke 122 is secured to the guide rod 98 and extends around and is spaced from both sides of the shaft 124.

The main shaft 124 is rotatably supported within the tube 126. Accordingly, the yoke 128 is secured to the tube 126 and extends around and is spaced from the guide rod 98 so as to prevent rotation of the tube when the main shaft is rotated.

In operation, as the floating shaft 164 moves toward the fixed shaft 166, and the member 18 is moved toward element 138, the rod 170 moves relative to the cylinder 172 (to the left in FIGS. 9-11). As the shaft 164 moves toward shaft 166, the block 160 moves the entire mechanism attached to bracket 92 in the same direction. As the mechanism is moved, the member 18 will be moved toward the element 138 until the edge of the member contacts the element 158. At this point in time the wheel 130 starts separating from the stop 176. The shaft 124 and tube 126 stop moving in the bushings 104. The shaft 124 will therefore stop moving within the aperture 180. The board and the mechanism continue to move together until the unit 74 finds the edge of the sheet 14.

Should member 18 fail to hit element 138, as the shaft 124 moves relative to rod 98, it should be appreciated that the yoke 122 will hit the wheel 130, moving the element 138 sufficiently to prevent damage to it by the articulating frame as the plunger bar moves toward the belt. Adjustment of the relative spacing of the element 138 and block 134 of the device shown is accomplished in the same manner as the device shown in FIGS. 3-7, i.e., by rotating the wheel 130.

The use of the edge locating device 80 or 80A provides a precise alignment of the edge of the member 18 with the sheet 14. Specifically, the contact element 138, which is precisely spaced from the unit 70 or 74, directly contacts the edge of the member 18. This will eliminate any misalignment errors of the member 18 within the articulating frame 36 which can occur in the apparatus shown in FIGS. 1 and 2, particularly when the alignment and laminating apparatus is operating at relatively high speeds.

While the devices 80 and 80A have been described for use with an alignment and laminating apparatus, such as shown in the aforementioned U.S. Pat. No. 4,336,094, its application is not limited to such a system. The device can be used in other systems such as the ones described in U.S. Pat. Nos. 3,400,031; 3,522,129; and 4,345,960, as well as any other sheet alignment and laminating apparatus. Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

1. A system for laminating at least a first sheet of material to a second sheet of material, said system comprising, in combination:

first support means for supporting said first sheet;

second support means for supporting said second sheet edge locating means secured with respect to said second support means, said edge locating means including edge contact means for making contact with and locating at least one edge of said second sheet supported by said second support means, means for moving said edge contact means and said second support means relative to one another so as to move said edge contact means and said one edge of said second sheet into contact with one another, and means, fixed with respect to said edge contact means, for locating the corresponding edge of said first sheet relative to said one edge of said second sheet; and means, responsive to said edge locating means, for moving at least one of said support means relative to the other so as to move said sheets into a predetermined alignment relation so that said one edge of said second sheet is disposed in a predetermined position relative to the corresponding edge of said first sheet, and for moving said sheets into contact with one another so as to laminate said sheets in said alignment relation.

2. A system according to claim 1, wherein said means for making contact with said at least one edge of said second sheet includes means for moving said edge locator means and said second sheet relative to one another.

3. A system according to claim 1, wherein said second support means is an articulatng frame adapted to be moved in either one of two directions in a plane parallel to and spaced from said first sheet.

4. A system according to claim 3, wherein said first support is a conveyor belt positioned below and adapted to move relative to said frame in a direction parallel to said plane.

5. A system according to claim 1, wherein said edge contact means comprises a contact element movable relative to and into contact with the edge of said second sheet, and said means for locating the corresponding edge of said first sheet comprises (a) a source of radiation and a detector of said radiation for precisely locating the edge of said first sheet, and (b) means for fixing the spacing between said contact element and said source and detector.

6. A system according to claim 5, wherein said spacing between said contact element and said source and detector is adjustable.

7. A system according to claim 5, wherein said edge locating means includes pneumatic means for moving said contact element into contact with the edge of said second sheet.

8. A system according to claim 7, wherein said pneumatic means includes a cylinder and a rod slidable in said cylinder in response to a pneumatic pressure.

9. A system according to claim 8, wherein said pneumatic pressure is a positive pressure.

10. A system according to claim 9, wherein said edge locating means includes means for accommodating overstroke of said rod in said cylinder after said contact element contacts the edge of said second sheet.

11. A system according to claim 10, wherein said means for accommodating said overstroke includes a compression spring which compresses during said overstroke.

12. A system according to claim 1, wherein said edge locating means further includes second edge contact means for making contact with and locating at least one other edge of said second sheet, means for moving said second edge contact means and said second support means relative to one another so as to move said second edge contact means and said one other edge of said second sheet into cntact with one another and means, fixed with respect to said second edge contact means, for locating a second corresponding edge of said first sheet relative to said one other edge of said second sheet; and said means for moving said one support means relative to said other support means includes means for moving said sheets into a predetermined alignment relation so that said other edge of said second sheet is disposed in a predetermined position relative to said second corresponding edge of said first sheet.

13. A system according to claim 1, wherein said means for moving said edge contact means and said second support means relative to one another includes means for moving said one edge of said second sheet into contact with said edge contact means.

14. A device for use in locating the edge of a first sheet supported by a first support and the edge of a second sheet supported by a second support at a predetermined distance from said first support so as to register said sheets in a predetermined relation, said device comprising, in combination:
means for securing said device to said second support; and
mechanism means, including an edge contact element for locating the edge of said second sheet, and a source of radiation and a detector of said radiation for locating said edge of said first sheet; wherein (1) said source and detector are mounted on said mechanism means so as to be fixedly spaced apart from edge contact element by a predetermined distance, and (2) said edge contact element, source and detector are movable relative to the second support and the edge of said second sheet supported by the second support between a first relative position, wherein said edge contact element is spaced from the edge of said second sheet, and a second relative position wherein said edge contact element contacts said edge of said second sheet.

15. A device according to claim 14, wherein said mechanism means includes actutation means for moving said edge contact element between said first and second positions.

16. A device according to claim 15, wherein said actuation means includes a cylinder operable between a first mode for relatively moving said edge contact element with said edge of said second sheet to said first relative position, and a second mode for relatively moving said edge contact element with said edge of said second sheet to said second relative position, and a shaft for supporting said edge contact element, source and detector, said shaft being movable so as to move said edge contact element to said first position responsively to said cylinder operating in said first mode and said second position responsively to said cylinder operating in said second mode.

17. A device according to claim 16, wherein said source and detector are movable on said shaft relative to said edge contact element so as to vary said predetermined distance.

18. A device according to claim 17, wherein said means for adjusting the distance travelled by said edge contact includes a wheel threadingly coupled to said shaft so as to vary the length of said shaft relative to said coupling means.

19. A device according to claim 16, wherein said cylinder includes a rod movable between a first position when said cylinder operates in said first mode and a second position when said cylinder operates in said second mode, coupling means for coupling said rod to said shaft.

20. A device according to claim 19, wherein said coupling means includes means for preventing the overstroke of said rod occurring as said cylinder changes operation between said first mode and said second mode from being transmitted to said shaft.

21. A device according to claim 20, wherein said means for preventing said overstroke includes a compression spring.

22. A device according to claim 21, wherein said means for adjusting the distance travelled by said edge contact includes a wheel threadingly coupled to said shaft so as to vary the length of said shaft relative to said coupling means.

* * * * *

UNITED STATES PATENT AND TRADEMARK OFFICE
CERTIFICATE OF CORRECTION

PATENT NO. : 4,708,759

DATED : November 24, 1987

INVENTOR(S) : Thomas M. Porat

It is certified that error appears in the above-identified patent and that said Letters Patent is hereby corrected as shown below:

Claim 1, column 8, line 12, after "sheet" insert -- ; --;

Cancel claim 2;

Claim 12, column 9, line 16, delete "cntact" and substitute therefor -- contact --.

On the Title Page "22 Claims" should read -- 21 Claims --.

Signed and Sealed this

Fourth Day of October, 1988

Attest:

DONALD J. QUIGG

Attesting Officer

Commissioner of Patents and Trademarks